United States Patent
DiFrancesco et al.

(10) Patent No.: US 10,626,744 B2
(45) Date of Patent: Apr. 21, 2020

(54) DUAL HYDORSTATIC SEAL ASSEMBLY

(71) Applicant: United Technologies Corporation, Farmington, CT (US)

(72) Inventors: Michael L. DiFrancesco, Waterbury, CT (US); Conway Chuong, Manchester, CT (US)

(73) Assignee: United Technologies Corporation, Farmington, CT (US)

(\*) Notice: Subject to any disclaimer, the term of this patent is extended or adjusted under 35 U.S.C. 154(b) by 98 days.

(21) Appl. No.: 15/720,071

(22) Filed: Sep. 29, 2017

(65) Prior Publication Data

US 2019/0101014 A1 Apr. 4, 2019

(51) Int. Cl.
| | |
|---|---|
| *F01D 11/02* | (2006.01) |
| *F01D 11/08* | (2006.01) |
| *F01D 25/22* | (2006.01) |
| *F16J 15/44* | (2006.01) |
| *F16J 15/00* | (2006.01) |
| *F16J 15/16* | (2006.01) |
| *F16J 15/34* | (2006.01) |

(52) U.S. Cl.
CPC ............ *F01D 11/02* (2013.01); *F01D 11/025* (2013.01); *F01D 11/08* (2013.01); *F01D 25/22* (2013.01); *F16J 15/002* (2013.01); *F16J 15/164* (2013.01); *F16J 15/442* (2013.01); *F16J 15/445* (2013.01); *F05D 2220/32* (2013.01); *F05D 2240/11* (2013.01); *F05D 2240/55* (2013.01); *F05D 2240/57* (2013.01); *F16J 15/3452* (2013.01)

(58) Field of Classification Search
CPC .......... F16J 15/442; F16J 15/441; F01D 5/02; F01D 11/025; F01D 11/12; F05B 2240/57
See application file for complete search history.

(56) References Cited

U.S. PATENT DOCUMENTS

| | | | | |
|---|---|---|---|---|
| 4,017,088 A | \* | 4/1977 | Lerjen | F16J 15/441 277/416 |
| 7,410,173 B2 | \* | 8/2008 | Justak | F01D 11/00 277/355 |
| 7,735,833 B2 | | 6/2010 | Braun et al. | |
| 7,896,352 B2 | \* | 3/2011 | Justak | F16J 15/442 277/411 |
| 8,002,285 B2 | \* | 8/2011 | Justak | F01D 11/02 277/412 |

(Continued)

OTHER PUBLICATIONS

Extended European Search Report for EP Application No. 18185831.7, dated Jan. 30, 2019, 7 pages.

*Primary Examiner* — Eugene G Byrd
(74) *Attorney, Agent, or Firm* — Kinney & Lange, P.A.

(57) ABSTRACT

A seal assembly includes first and second rings. The first ring includes a first outer ring, a first beam connected to the first outer ring, and a first shoe. The first shoe includes free and fixed ends and is configured to move radially. The second seal ring is disposed axially adjacent and is attached to the first seal ring. The second seal ring includes a second outer ring, a second beam connected to the second outer ring, and a second shoe. The second shoe includes free and fixed ends and is configured to move in a generally radial direction. The free end of the second shoe is disposed axially adjacent to the fixed end of the first shoe. The fixed end of the second shoe is disposed axially adjacent to the free end of the first shoe.

13 Claims, 3 Drawing Sheets

(56) References Cited

U.S. PATENT DOCUMENTS

| | | | |
|---|---|---|---|
| 8,172,232 B2* | 5/2012 | Justak | F16J 15/442 |
| | | | 277/411 |
| 8,641,045 B2* | 2/2014 | Justak | F16J 15/442 |
| | | | 277/412 |
| 8,919,781 B2* | 12/2014 | Justak | F01D 11/025 |
| | | | 277/411 |
| 9,045,994 B2* | 6/2015 | Bidkar | F01D 11/02 |
| 9,097,350 B2 | 8/2015 | Dale | |
| 9,115,810 B2* | 8/2015 | Bidkar | F16J 15/447 |
| 9,587,746 B2* | 3/2017 | Bidkar | F01D 11/025 |
| 9,611,749 B2 | 4/2017 | Thatte et al. | |
| 10,184,347 B1* | 1/2019 | D'Ambruoso | F01D 11/003 |
| 2003/0080513 A1* | 5/2003 | Kirby, III | F16J 15/441 |
| | | | 277/416 |
| 2011/0121519 A1 | 5/2011 | Justak | |
| 2014/0008871 A1* | 1/2014 | Bidkar | F16J 15/447 |
| | | | 277/303 |
| 2015/0285152 A1 | 10/2015 | Hayford et al. | |
| 2015/0322816 A1* | 11/2015 | Schmitz | F01D 1/04 |
| | | | 60/796 |
| 2016/0130963 A1* | 5/2016 | Wilson | F01D 11/001 |
| | | | 60/805 |
| 2017/0211406 A1* | 7/2017 | Peters | F03B 3/12 |
| 2018/0058240 A1* | 3/2018 | Chuong | F01D 5/02 |

\* cited by examiner

DUAL HYDROSTATIC SEAL ASSEMBLY

STATEMENT OF GOVERNMENT INTEREST

This invention was made with government support under FA8626-16-C-2139 awarded by the United States Air Force. The government has certain rights in the invention.

BACKGROUND

The present disclosure relates generally to seal assemblies, and more particularly to seal rings for use in gas turbine engines.

Honeycomb and knife-edge seals can be used to form a seal at the interface between rotating and static components within the turbine section of a gas turbine engine. Over time, knife-edge seals can wear a trench into the honeycomb causing gaps and sporadic increased leaks over time.

Floating non-contact seal (a.k.a., hydrostatic seal) configurations allow radial motion of shoe components relative to a rotating component. Seal rings can vary a gap between the sealing element and a rotating component by adjusting in response to the change in pressure across the sealing element. A shoe component of the floating non-contact seal is drawn radially inward and outward (toward and away) from the rotating component in response to the pressure across the sealing element. The shoe is supported on one end by spring-like beams. The shoe has a distributed load that is acted over the shoe from flow of a fluid passing across the seal. Because of this, the shoe effectively deforms as a cantilevered beam creating clearance variation with the rotating component thereby reducing sealing effectiveness. The shoe is configured such that the free end of the shoe deflects further inboard and outboard than the fixed end of the shoe. Due to this, the sealing effectiveness of the shoe is limited and a propensity for clash with the rotating component is increased.

Structures and configurations of seal rings are the subject of the following commonly owned U.S. Patent Publications US2016/0130963A1, US2015/0322816A1, and US2015/0285152A1 (incorporated by reference herein in their entireties).

SUMMARY

A seal assembly includes first and second rings. The first ring includes a first outer ring, a first beam connected to the first outer ring, and a first shoe. The first shoe includes free and fixed ends and is configured to move radially. The second seal ring is disposed axially adjacent and is attached to the first seal ring. The second seal ring includes a second outer ring, a second beam connected to the second outer ring, and a second shoe. The second shoe includes free and fixed ends and is configured to move in a generally radial direction. The free end of the second shoe is disposed axially adjacent to the fixed end of the first shoe. The fixed end of the second shoe is disposed axially adjacent to the free end of the first shoe.

A seal assembly for use in a gas turbine engine that includes a rotating structure, a static structure aligned with the rotating structure along a radial direction, and a floating non-contact seal disposed between the rotating structure and the static structure. The floating non-contact seal includes a first seal ring, a second seal ring disposed axially adjacent and attached to the first seal ring, a pin, and a seal element. The first seal ring includes a first outer ring, a first beam connected to the first outer ring, and a first shoe connected to and extending from the first beam. The first shoe includes a first free end and a first fixed end. The second seal ring includes a second outer ring, a second beam connected to the second outer ring, and a second shoe connected to and extending from the second beam. The second shoe includes a second free end and a second fixed end. The second free end of the second shoe is disposed axially adjacent to the first fixed end of the first shoe. The second fixed end of the second shoe is disposed axially adjacent to the first free end of the first shoe. The pin is engaged with the first seal ring and the second seal ring such that the first and second seal rings are attached to each other via the pin. The seal element is connected to and extends radially inward from at least one of the first shoe and the second shoe.

A method includes drawing a fluid across a hydrostatic seal assembly that includes a first hydrostatic seal ring and a second hydrostatic seal ring disposed axially adjacent and attached to the first seal ring. The first hydrostatic seal ring includes a first outer ring, a first beam connected to the first outer ring, and a first shoe connected to and extending from the first beam. The first shoe includes a first free end and a first fixed end. The second hydrostatic seal ring includes a second outer ring, a second beam connected to the second outer ring, and a second shoe connected to and extending from the second beam. The second shoe includes a second free end and a second fixed end. The first free end and the first fixed end of the first shoe are moved in a radial direction in response to a pressure differential across the seal assembly. The second free end of the second shoe is moved by way of the second free end being attached to the first fixed end of the first shoe. The second fixed end of the second shoe is moved by way of the second fixed end being attached to the first free end of the first shoe.

DETAILED DESCRIPTION

Figure 1:
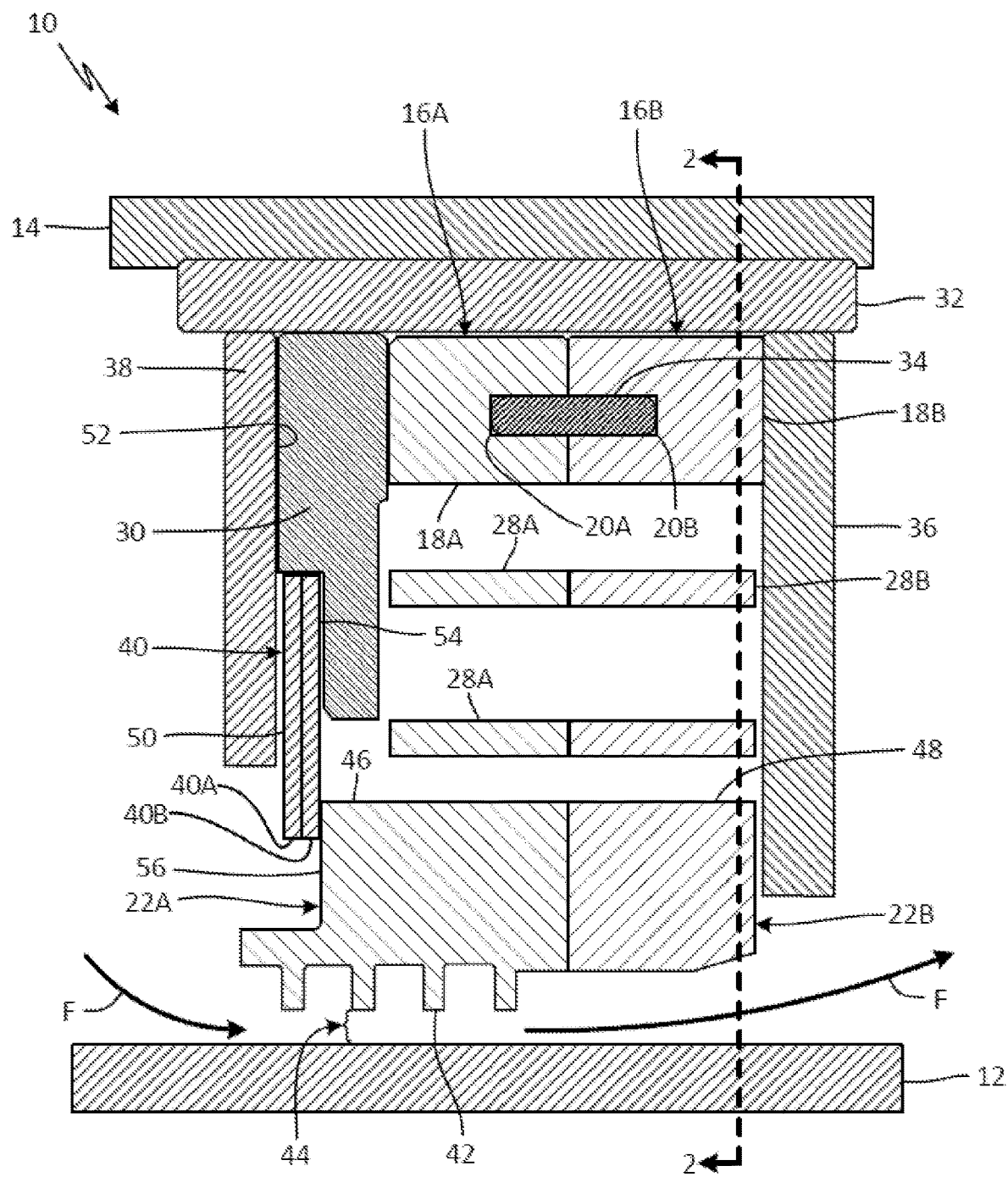
FIG. 1 is a cross-section view of a seal assembly with a rotating structure, a static structure, and a pair of seal rings.
Figure 2:
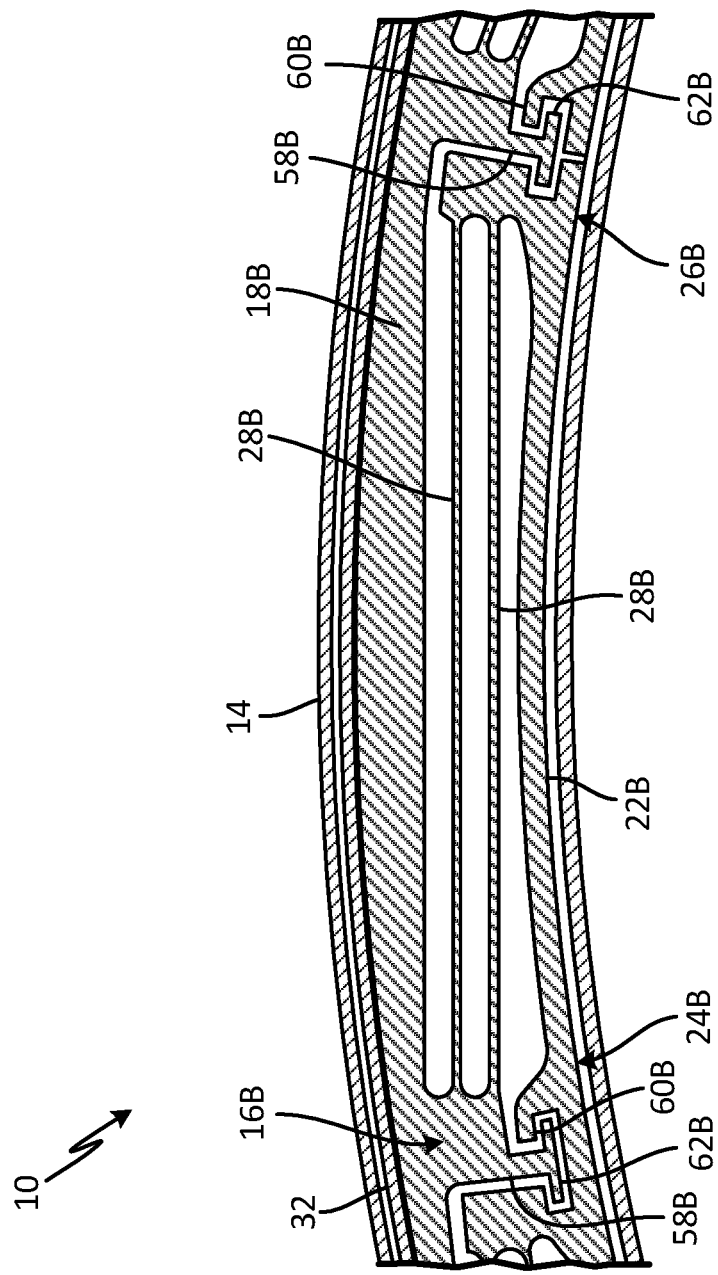
FIG. 2 is a cross-sectional view of a portion of the seal assembly with the rotating structure, the static structure, and one of the seal rings taken along 2-2 in FIG. 1 and such that an upstream direction is into the page.
Figure 3:
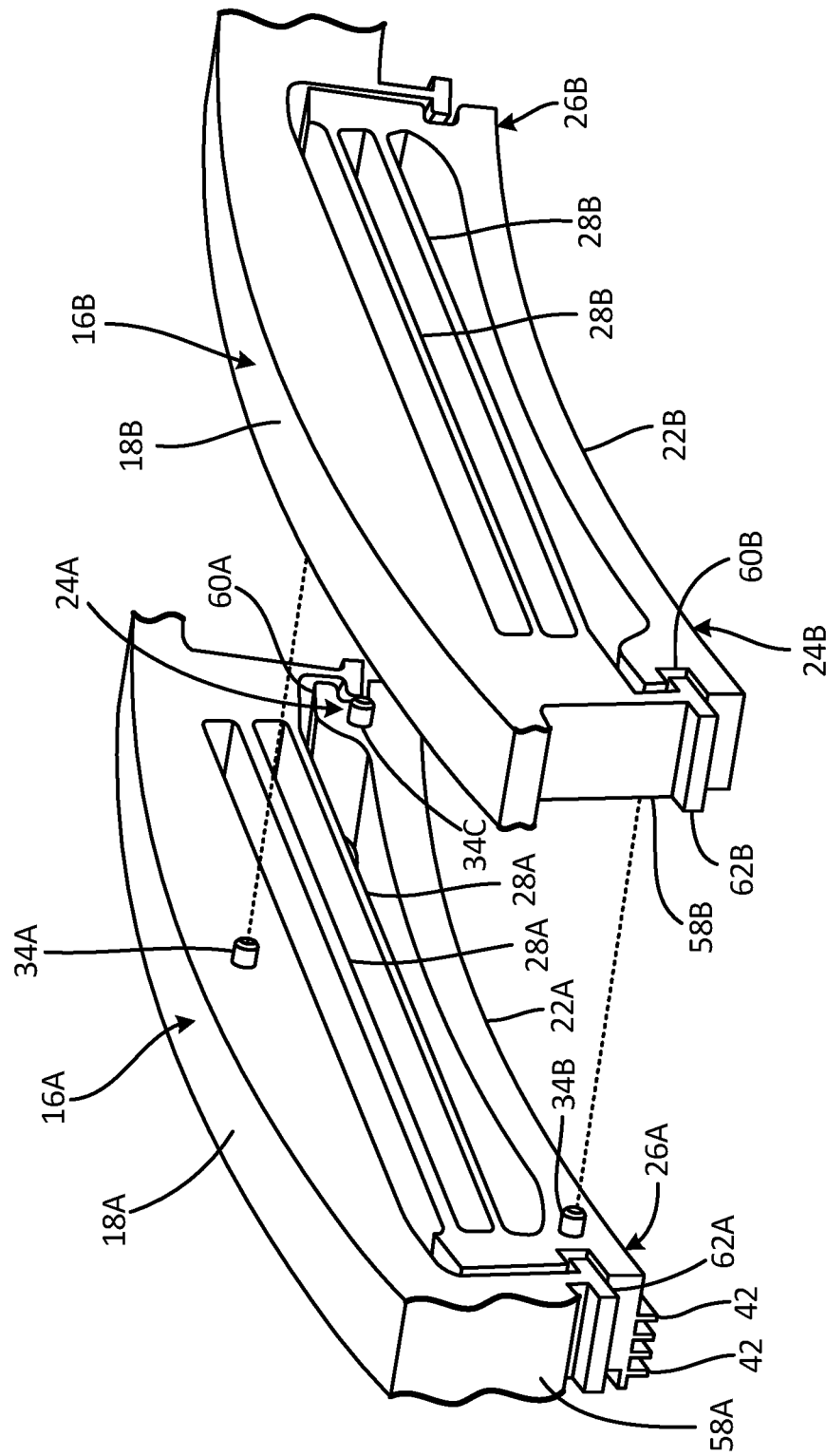
FIG. 3 is a perspective view of a portion of the pair of seal rings.

FIGS. 1, 2, and 3 show different aspects of seal assembly 10 with rotating structure 12, static structure 14, first seal ring 16A, and second seal ring 16B and are discussed as a group below. FIG. 1 is a cross-section view of seal assembly 10 such that a downstream direction is left to right in FIG. 1. FIG. 2 is a cross-sectional view of seal assembly 10 with rotating structure 12, static structure 14, and seal ring 16B taken along 2-2 in FIG. 1. FIG. 3 is a perspective view of seal assembly 10 with rotating structure 12 and static structure 14 omitted for clarity. Additionally, the views of seal assembly 10 in FIGS. 2 and 3 represent a portion of an entire circumference of seal assembly 10 which extends in a complete annulus, circle, or ring. As discussed in U.S. Patent Publications US2016/0130963A1, US2015/0322816A1, and US2015/0285152A1, seal assembly 10 with first and second seal rings 16A and 16B can be located within the turbine section of a gas turbine engine.

Seal assembly 10 includes rotating structure 12, static structure 14, first seal ring 16A, and second seal ring 16B. First seal ring 16A includes first outer ring 18A (with first hole 20A), first shoe 22A (with first free end 24A and first fixed end 26A), and first beams 28A. Second seal ring 16B includes second outer ring 18B (with second hole 20B), second shoe 22B (with second free end 24B and second fixed end 26B), and second beams 28B. Seal assembly 10 further includes spacer 30, carrier 32, pin 34, plate 36, seal cover 38, and seals 40 (with first seal 40A and secondary seal 40B). First shoe 22A includes teeth 42. A space between rotating structure 12 and teeth 42 forms gap 44. First shoe 22A includes upstream portion 46 and second shoe 22B includes downstream portion 48. Seal assembly 10 additionally includes upstream face 50 of seals 40, downstream face 52 of seal cover 38, downstream face 54 of seals 40, and upstream face 56 of first shoe 22A. FIGS. 2 and 3 show seal assembly 10 additionally including stems 58, arms 60, and extensions 62.

Rotating structure 12 includes a structure of a gas turbine engine that is rotating. In one non-limiting embodiment, rotating structure 12 can include a rotor of a compressor section or a turbine section of a gas turbine engine. Static structure 14 includes a structure of a gas turbine engine that is static or non-rotating. In one non-limiting embodiment, static structure 14 can include a stator of a compressor section or a turbine section of a gas turbine engine.

First and second seal rings 16A and 16B include hydrostatic fluid or floating non-contact seals. In one non-limiting embodiment, first and/or second seal rings 16A and 16B can be made out of a nickel alloy material, such as an austenitic nickel-based superalloy, or other metallic alloys favorable for use in high temperature applications. In some non-limiting embodiments, an axial thickness or width of either first seal ring 16A or second seal ring 16B can be 0.1 to 0.375 inches (0.254 to 0.95 centimeters). First and second outer rings 18A and 18B include rings of solid material. First and second holes 20A and 20B include narrow apertures or openings.

First and second shoes 22A and 22B include solid pieces of material with partially annular shapes and generally rectangular shaped cross-sections (from the viewpoint of looking into the page in FIG. 1). First shoe 22A includes first free end 24A, first fixed end 26A, and upstream portion 46. Second shoe 22B includes second free end 24B, second fixed end 26B, and downstream portion 48. First free end 24A includes an end of first shoe 22A that is not attached directly to first beam 28A. Second free end 24B includes an end of second shoe 22B that is not directly attached to second beam 28B. First end 26A includes an end of first shoe 22A that is attached directly to first beam 28A on an opposite end of first beam 28A that is attached directly to first outer ring 18A. Second fixed end 26B includes an end of second shoe that is attached directly to second beam 28B on an opposite end of second beam 28B that is attached directly to second outer ring 18B.

First and second beams 28A and 28B include elongate resilient elements or springs capable of springing back into shape upon radial deflection (upward or downward in FIGS. 1 and 2). In one non-limiting embodiment, first beam 28A and/or second beam 28B can include two (as shown in FIGS. 1 and 2) or more individual beams. Spacer 30 (FIG. 1) includes a ring-shaped plate of solid material. Carrier 32 (FIG. 1) includes an annular ribbon or sleeve of solid material. Pin 34 (FIG. 1) includes a peg or dowel of solid material. In other non-limiting embodiments, pin 34 can be replaced with a braze or weld joint. In one non-limiting embodiment, seal assembly 10 can include first pin 34A, second pin 34B, and third pin 34C (as shown in FIG. 3). In other non-limiting embodiments, seal assembly 10 can include more or less than three pins to affix portions of first seal ring 16A to portions of second seal ring 16B such as first free end 24A to second fixed end 26B, first fixed end 26A to second free end 24A, and first outer ring 18A to second outer ring 18B.

Plate 36 (FIG. 1) includes a ring-shaped plate of solid material. Plate 36 includes scallops or holes (not shown in FIG. 1) along plate 36. Seal cover 38 (FIG. 1) includes a ring of solid material. Seals 40 (FIG. 1) include ring-shaped, or partially ring-shaped, pieces of pliant solid material, which can include a cobalt alloy or other types of metallic alloys suitable for wear resistance. Seals 40 extend in a vertical direction as shown in FIG. 1. In this non-limiting embodiment, seals 40 include two seals (e.g., first seal 40A and secondary seal 40B), but in other non-limiting embodiments can include more or less than two seals. Teeth 42 include solid pieces of material and ring-shaped are seal elements. Gap 44 (FIG. 1) includes a space between teeth 42 and rotating structure 12.

Upstream portion 46 of first shoe 22A includes a portion of first shoe 22A that is located on an upstream (to the left in FIG. 1) end of first shoe 22A. Downstream portion 48 of second shoe 22B includes a portion of second shoe 22B that is located on a downstream (to the right in FIG. 1) end of second shoe 22B. Upstream face 50 includes a face of first seal 40A that faces in an upstream direction and is located at an upstream end of seals 40. Downstream face 52 includes a face of seal cover 38 that faces in a downstream direction and is located at a downstream end of seal cover 38. Downstream face 54 includes a face of secondary seal 40B that faces in a downstream direction and is located at a downstream end of seals 40. Upstream face 56 includes a face of first shoe 22A that faces in an upstream direction and is located on upstream portion 46 of first shoe 22A.

As shown in FIGS. 2 and 3, first and second stems 58A and 58B include solid ribbon-shaped pieces of material that extend along an axial length of first and second shoes 22A and 22B, respectively. First and second arms 60A and 60B include lips formed of solid material that extend partially radially outward from first and second shoes 22A and 22B, respectively. First and second extensions 62A and 62B include T-shaped pieces of solid material.

Seal assembly 10 is configured to be disposed in a turbine section of a gas turbine engine (omitted in FIGS. 1 and 2 for clarity). Rotating structure 12 is disposed radially within first and second seal rings 16A and 16B and static structure 14. In other non-limiting embodiments, static structure 14 can be disposed radially within rotating structure 12 with first and second seal rings 16A and 16B disposed radially between rotating structure 12 and static structure 14. Static structure 14 is radially aligned with the rotating structure 12 such that static structure 14 and rotating structure 12 are aligned in a direction extending radially outward from rotating structure 12. In one non-limiting embodiment, first and second seal rings 16A and 16B are attached to static structure 14 such that rotating structure 12 rotates relative to static structure 14 and first and second seal rings 16A and 16B during operation of seal assembly 10.

First and second seal rings 16A and 16B are disposed radially inward of and are integrally formed with first and second outer rings 18A and 18B, respectively. First seal ring 16A is attached and disposed axially adjacent to second seal ring 16B. First seal ring 16A is attached to second seal ring 16B via mechanical attachment with pins 34. In another non-limiting embodiment, first seal ring 16A is attached to second seal ring 16B via chemical attachment such as by welding or brazing. Second seal ring 16B is attached and disposed axially adjacent to first seal ring 16A. First and second outer rings 18A and 18B are positioned radially between carrier 32 and first and second beams 28A and 28B, respectively. First hole 20A is disposed in a downstream face of first annular base 18A. Second hole 20B is disposed in an upstream face of second annular base 18B. First and second holes 20A and 20B extend axially into portions of first and second seal rings 16A and 16B, respectively.

First shoe 22A is connected to and extends from first beam 28A. First shoe 22A is configured to move in a generally radial direction relative to first outer ring 18A and relative to rotating structure 12. Second shoe 22B is connected to and extends from second beam 28B. Second shoe 22B is configured to move in a generally radial direction relative to second outer ring 18B. First free end 24A is disposed on an opposite end of first shoe 22A from first fixed end 26A. First free end 24A of first shoe 22A is disposed axially adjacent to and is axially aligned (i.e., aligned along an axial direction relative to seal assembly 10) with second fixed end 26B of second shoe 22B. Second free end 24B is disposed on an opposite end of second shoe from second fixed end 26B. Second free end 24B of second shoe is disposed axially adjacent to and is axially aligned (i.e., aligned along an axial direction relative to seal assembly 10) with first fixed end 26A of first shoe 22A. First fixed end 26A of first shoe 22A is connected to first beams 28A. Second fixed end 26B of second shoe 22B is connected to second beams 28B.

In one non-limiting embodiment, first and second beams 28A and 28B extend in a direction orthogonal to the axial direction of seal assembly 10. First beams 28A are integrally formed with first shoe 22A such that first shoe 22A and first beams 28A can be formed out of a single piece of continuous material, and likewise for second shoe 22B and second beams 28B. In another non-limiting embodiment, first beams 28A can be integrally formed with first outer ring 18A and/or second beams 28B can be integrally formed with second outer ring 18B. First and second beams 28A and 28B include a dual-beam design which causes first and second shoes 22A and 22B to move in a radial direction (up and down in FIG. 1). In other non-limiting embodiments, first and/or second beams 28A and 28B can include more or less than two beams. FIG. 3 shows a portion of the entire circumferences of first and second seal rings 16A and 16B. In one non-limiting embodiment, the entire circumference of first and/or second seal rings 16A and 16B can include approximately fifty shoes and corresponding sets of beams.

Spacer 30 is disposed axially downstream of seal cover 32 and axially upstream of first outer ring 18A and first beams 28A. Spacer 30 is positioned between first seal ring 16A and seals 40 to create axial spacing between first beams 28A and seals 40. Carrier 32 includes a support ring for securing first and second seal rings 16A and 16B to static structure 14. Carrier 32 is positioned radially between static structure 14 and first and second seal rings 16A and 16B. In other non-limiting embodiments, carrier 32 can be a part of static structure 14. First pin 34A is disposed in hole 20 to attach first outer ring 18A to second outer ring 18B. Second pin 34B affixes or attaches first fixed end 26A of first shoe 22A to second free end 24B of second shoe 22B. Third pin 34C affixes or attaches second fixed end 26B of second shoe to first free end 24A of first shoe 22A. Plate 36 is disposed along a downstream side of second beams 28B and second shoe 22B. The scallops or holes (not shown) of plate 36 allow for fluid communication across plate 36. Seal cover 38 is disposed axially upstream of seals 40.

Seals 40 are disposed axially upstream of first beams 28A and come into contact with upstream face 56 first shoe 22A.

Seals 40 are disposed between seal cover 38 and first shoe 22A such that upstream face 50 of seals 40 is out of contact with downstream face 52 of seal cover 38 and downstream face 54 of seals 40 is in contact with upstream face 56 of first shoe 22A. Upstream face 56 of first shoe 22A includes a face of first shoe 22A that faces in an upstream direction (to the left in FIG. 1) and is located downstream of a furthest upstream portion of first shoe 22A. Teeth 42 are connected to and extend radially inward from first shoe 22A and into gap 44. In another non-limiting embodiment, teeth 42 are connected to and extend radially inward from at least one of first shoe 22A and second shoe 22B. Gap 44 is formed between teeth 42 and rotating structure 12 for allowing air flow F to pass across first and second seal rings 16A and 16B in a downstream direction (as shown by the direction of the arrowheads of air flow F). In FIGS. 1 and 3, a direction of fluid flow is generally left to right.

First and second stems 58A and 58B are connected to and extend radially inward from first and second outer rings 18A and 18B, respectively. First and second arms 60A and 60B are attached to, or formed as a part of, first and second shoes 22A and 22B, respectively. First and second arms 60A and 60B form a notch with first and second shoes 22A and 22B, respectively creating a space for first and second extensions 62A and 62B, respectively to be disposed in. Spacing is provided between first and second extensions 62A and 62B and first and second arms 60A and 60B, respectively to allow first and second arms 60A and 60B to move as first and second shoes 22A and 22B move radially inward or outward. First and second extensions 62A and 62B are connected to first and second outer rings 18A and 18B, respectively by first and second stems 58A and 58B, respectively.

During operation of seal assembly 10, first seal ring 16A sealingly engages with rotating structure 12 to control an amount of fluid and fluid pressure across first seal ring 16A between components of a gas turbine engine. Floating non-contact seal 16 adjusts in response to the change in pressure across first seal ring 16A by drawing first shoe 22A towards or away from rotating structure 12 to adjust gap 44 between first shoe 22A and rotating structure 12. As first shoe 22A is drawn towards or away from rotating structure 12, second shoe 22B is also drawn towards or away from rotating structure 12 due to first shoe 22A and second shoe 22B being attached via pins second and third 30B and 30C.

During operation of seal assembly 10, first and second seal rings 16A and 16B regulate air flow F from a high pressure side of first and second seal rings 16A and 16B (to the left in FIG. 1) to a low pressure side of first and second seal rings 16A and 16B (to the right in FIG. 1). As air flow F flows past teeth 42 of first seal ring 16A, a pressure field across seal assembly 10 changes. First and second shoes 22A and 22B are drawn towards or away from rotating structure 12 due to a pressure differential across a radially inward side and a radially outward side of first and second shoes 22A and 22B. If the pressure differential across first and second shoes 22A and 22B are high, first and second shoes 22A and 22B are pushed by the high pressure in a radially outward direction to allow the high pressure flow to release into the area of low pressure through plate 36. If the pressure differential across first and second shoes 22A and 22B are low, the radially outward force applied to first and second shoes 22A and 22B is lessened which lowers first and second shoes 22A and 22B radially inward towards rotating structure 12 restricting and thereby reducing the amount of flow F allowed past first and second shoes 22A and 22B.

First pin 34A attaches or affixes first outer ring 18A to second outer ring 18B to prevent relative rotation between first and second seal rings 16A and 16B. Radially inward and outward motion of first and second shoes 22A and 22B is limited by the configuration of first and second stems 58A and 58B, first and second arms 60A and 60B, and first and second extensions 62A and 62B. As first and second shoes 22A and 22B move radially outward, first and second arms 60A and 60B come into contact with portions of first and second beams 28A and 28B, respectively which prevents a large clearance between first and second shoes 22A and 22B and rotating structure 12 from occurring. Conversely, as first and second shoes 22A and 22B moves radially inward, first and second arms 60A and 60B come into contact with first and second extensions 62A and 62B preventing teeth 42 of first shoe 22A from coming into contact with rotating structure 12.

As the pressure differential across floating non-contact seal 16 balances out, first and second shoes 22A and 22B move radially outward and inward (upward and downward in FIGS. 1 and 2) until pressure equilibrium is achieved, for example a pressure of upstream of first and second shoes 22A and 22B and a pressure downstream of first and second shoes 22A and 22B becomes equal. The pressure equilibrium across first and second shoes 22A and 22B results in a force balance allowing first and second shoes 22A and 22B to adjust the size of gap 44 and maintaining clearances between teeth 42 of first shoe 22A and rotating structure 12. As first and second shoes 22A and 22B move up and down, seals 40 slide along first shoe 22A to maintain sealing engagement and force balances. First and second outer rings 18A and 18B function to support first and second seal rings 16A and 16B, respectively. First and second outer rings 18A and 18B extend for the entire circumference of first and second seal rings 16A and 16B, respectively.

In prior art seal assemblies with a single seal ring, each shoe deforms similar to a cantilevered beam. Since the shoe is supported on one end with a distributed load acted over the shoe from the flow across the seal, the free end of the shoe deflects further inboard and outboard than the fixed end. Put another way, existing shoes are cantilevered such that a first end of the shoe is lifted and lowered differently than the second end of the shoe causing a non-uniform sealing engagement with the rotating structure across a length of the shoe (i.e., the gap between the teeth and the rotating structure is non-uniform along the length of a particular shoe). This motion creates clearance variation across the shoe which reduces sealing effectiveness of the seal ring and causes an imbalance across the entire circumference of the rotating element. Propensity for the shoe to clash with the rotating element is also increased potentially causing wear, damage, and/or engine failure.

Seal assembly 10 addresses these issues by causing first and second shoes 22A and 22B to move up and down evenly. In other words, as first shoe 22A is moved due to its hydrostatic sealing effect, first free end 24A will have the same rate of radial motion as first fixed end 26A by way of first shoe 22A and second shoe 22B being attached via second and third pins 34B and 34C. Likewise, second free end 24B and second fixed end 26B of second shoe 22B will have the same amount of radial motion as second shoe 22B is moved due to its hydrostatic sealing effect. Seal assembly 10 with first and second seal rings 16A and 16B minimizes the sealing ineffectiveness of the shoes by having motions of first shoe 22A and second shoe 22B complement each other to effectively eliminate the individual cantilevered motion of first and second shoes 22A and 22B. Second shoe 22B reduces the cantilevered nature of first free end 24A of first shoe 22A by way of second fixed end 26B being attached to first free end 24A by third pin 34C. Likewise, first shoe 22A reduces the cantilevered nature of second free end 24B of second shoe 22B by way of first fixed end 26A being attached to second free end 24B of second shoe 22B by second pin 34B. The net effect of first and second shoes 22A and 22B balancing out the cantilevered effect of the other shoe is a more even sealing effect from each shoe as compared to single cantilevered shoes in existing designs.

The configuration of seal assembly 10 with first and second seal rings 16A and 16B also reduces the manufacturing burden of creating seal assembly 10 by reducing the axial thickness of first and second seal rings 16A and 16B as compared to a single seal ring. This reduction in thickness allows for the use of manufacturing processes, such as laser waterjet, etc., that are typically unsuitable for relatively thicker pieces of material. Here, first and second seal rings 16A and 16B are thin enough to allow use of a laser waterjet process without the occurrence of issues such as coning of the cutting channel or tapering of the part which occurs with thicker workpieces.

Discussion of Possible Embodiments

The following are non-exclusive descriptions of possible embodiments of the present invention.

A seal assembly includes first and second rings. The first ring includes a first outer ring, a first beam connected to the first outer ring, and a first shoe. The first shoe includes free and fixed ends and is configured to move radially. The second seal ring is disposed axially adjacent and is attached to the first seal ring. The second seal ring includes a second outer ring, a second beam connected to the second outer ring, and a second shoe. The second shoe includes free and fixed ends and is configured to move in a generally radial direction. The free end of the second shoe is disposed axially adjacent to the fixed end of the first shoe. The fixed end of the second shoe is disposed axially adjacent to the free end of the first shoe.

The seal assembly of the preceding paragraph can optionally include, additionally and/or alternatively, any one or more of the following features, configurations and/or additional components.

The seal assembly can further comprise a hydrostatic seal.

The seal assembly can be configured to be disposed in a turbine section of a gas turbine engine.

The seal assembly can further comprise a spacer that can be disposed axially adjacent and/or in contact with one of the first seal ring or the second seal ring, a secondary seal that can be in contact with the spacer and/or against one of the first seal ring or the second seal ring, a seal cover that can be in contact with a portion of the spacer such that the seal cover can retain the secondary seal against the spacer and/or one of the first seal ring or the second seal ring, a carrier that can be disposed radially outward from the first seal ring and/or the second seal ring, and a seal plate that can be disposed on an axial end of the seal assembly opposite from the seal cover, wherein the seal plate can be radially inward from and/or in contact with the carrier.

The first seal ring can be attached to the second seal ring via mechanical attachment.

A pin can be engaged with the first seal ring and/or the second seal ring such that the first and second seal rings can be attached to each other via the pin.

The seal assembly can further comprise a plurality of pins, wherein a first pin of the plurality of pins can attach the first outer ring of the first seal ring to the second outer ring of the second seal ring, wherein a second pin of the plurality of pins can attach the first free end of the first shoe to the second fixed end of the second shoe, and wherein a third pin of the plurality of pins can attach the first fixed end of the first shoe to the second free end of the second shoe.

The first seal ring can be attached to the second seal ring via chemical attachment.

The first seal ring can be attached to the second seal ring by welding or brazing.

The first shoe of the first seal ring can be circumferentially aligned with the second shoe of the second seal ring.

A seal element can be connected to and/or extend radially inward from at least one of the first shoe and the second shoe.

A seal assembly for use in a gas turbine engine that includes a rotating structure, a static structure aligned with the rotating structure along a radial direction, and a floating non-contact seal disposed between the rotating structure and the static structure. The floating non-contact seal includes a first seal ring, a second seal ring disposed axially adjacent and attached to the first seal ring, a pin, and a seal element. The first seal ring includes a first outer ring, a first beam connected to the first outer ring, and a first shoe connected to and extending from the first beam. The first shoe includes a first free end and a first fixed end. The second seal ring includes a second outer ring, a second beam connected to the second outer ring, and a second shoe connected to and extending from the second beam. The second shoe includes a second free end and a second fixed end. The second free end of the second shoe is disposed axially adjacent to the first fixed end of the first shoe. The second fixed end of the second shoe is disposed axially adjacent to the first free end of the first shoe. The pin is engaged with the first seal ring and the second seal ring such that the first and second seal rings are attached to each other via the pin. The seal element is connected to and extends radially inward from at least one of the first shoe and the second shoe.

The seal assembly of the preceding paragraph can optionally include, additionally and/or alternatively, any one or more of the following features, configurations and/or additional components.

The seal assembly can be disposed in a turbine section of the gas turbine engine.

The floating non-contact seal can comprise a hydrostatic seal.

The floating non-contact seal can be configured to sealingly engage with the rotating element.

A method includes drawing a fluid across a hydrostatic seal assembly that includes a first hydrostatic seal ring and a second hydrostatic seal ring disposed axially adjacent and attached to the first seal ring. The first hydrostatic seal ring includes a first outer ring, a first beam connected to the first outer ring, and a first shoe connected to and extending from the first beam. The first shoe includes a first free end and a first fixed end. The second hydrostatic seal ring includes a second outer ring, a second beam connected to the second outer ring, and a second shoe connected to and extending from the second beam. The second shoe includes a second free end and a second fixed end. The first free end and the first fixed end of the first shoe are moved in a radial direction in response to a pressure differential across the seal assembly. The second free end of the second shoe is moved by way of the second free end being attached to the first fixed end of the first shoe. The second fixed end of the second shoe is moved by way of the second fixed end being attached to the first free end of the first shoe.

The method of the preceding paragraph can optionally include, additionally and/or alternatively, any one or more of the following steps, features, configurations and/or additional components.

Relative motion between the first seal ring and the second seal ring can be prevented with a first pin engaged with the first and/or second seal rings.

A second pin can be moved with the first fixed end of the first shoe, wherein the second pin can be engaged with the first fixed end of the first shoe and/or with the second free end of the second shoe such that as the first fixed end moves the second pin, the second pin can cause the second free end of the second shoe to move.

A third pin can be moved with the first free end of the first shoe, wherein the third pin can be engaged with the first free end of the first shoe and/or with the second fixed end of the second shoe such that as the first free end moves the third pin, the third pin can cause the second fixed end of the second shoe to move.

A uniform gap can be maintained between the first free end and the first fixed end relative to the rotating structure as the first shoe is moved radially.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A seal assembly comprising:
   a first seal ring comprising:
      a first outer ring;
      a first beam connected to the first outer ring;
      a first shoe connected to and extending from the first beam, the first shoe with a first free end and a first fixed end, wherein the first shoe is configured to move in a generally radial direction relative to the first outer ring;
   a second seal ring disposed axially adjacent and attached to the first seal ring, wherein the first seal ring is attached to the second seal ring via mechanical attachment, wherein the second seal ring comprises:
      a second outer ring;
      a second beam connected to the second outer ring; and
      a second shoe connected to and extending from the second beam, the second shoe with a second free end and a second fixed end, wherein the second shoe is configured to move in a generally radial direction relative to the second outer ring, wherein the second free end of the second shoe is disposed axially adjacent to the first fixed end of the first shoe, and wherein the second fixed end of the second shoe is disposed axially adjacent to the first free end of the first shoe, and
   at least one pin that is engaged with the first seal ring and the second seal ring such that the first and second seal rings are attached to each other via the at least one pin.
2. The seal assembly of claim 1, further comprising a hydrostatic seal.

3. The seal assembly of claim 1, wherein the seal assembly is configured to be disposed in a turbine section of a gas turbine engine.

4. The seal assembly of claim 1 and further comprising:
- a spacer disposed axially adjacent and in contact with one of the first seal ring or the second seal ring;
- a secondary seal in contact with the spacer and against one of the first seal ring or the second seal ring;
- a seal cover in contact with a portion of the spacer such that the seal cover retains the secondary seal against the spacer and one of the first seal ring or the second seal ring;
- a carrier disposed radially outward from the first seal ring and the second seal ring; and
- a seal plate disposed on an axial end of the seal assembly opposite from the seal cover, wherein the seal plate is radially inward from and in contact with the carrier.

5. The seal assembly of claim 1, wherein the at least one pin comprises a plurality of pins, wherein a first pin of the plurality of pins attaches the first outer ring of the first seal ring to the second outer ring of the second seal ring, wherein a second pin of the plurality of pins attaches the first free end of the first shoe to the second fixed end of the second shoe, and wherein a third pin of the plurality of pins attaches the first fixed end of the first shoe to the second free end of the second shoe.

6. The seal assembly of claim 1, wherein the first seal ring is attached to the second seal ring via chemical attachment.

7. The seal assembly of claim 6, wherein the first seal ring is attached to the second seal ring by welding or brazing.

8. The seal assembly of claim 1, wherein the first shoe of the first seal ring is circumferentially aligned with the second shoe of the second seal ring.

9. The seal assembly of claim 1 and further comprising a seal element connected to and extending radially inward from at least one of the first shoe and the second shoe.

10. A seal assembly for use in a gas turbine engine, the seal assembly comprising:
- a rotating structure;
- a static structure aligned with the rotating structure along a radial direction;
- a floating non-contact seal disposed between the rotating structure and the static structure, the floating non-contact seal comprising:
  - a first seal ring comprising:
    - a first outer ring;
    - a first beam connected to the first outer ring; and
    - a first shoe connected to and extending from the first beam, the first shoe with a first free end and a first fixed end;
  - a second seal ring disposed axially adjacent and attached to the first seal ring, wherein the first seal ring is attached to the second seal ring via mechanical attachment, wherein the second seal ring comprises:
    - a second outer ring;
    - a second beam connected to the second outer ring; and
    - a second shoe connected to and extending from the second beam, the second shoe with a second free end and a second fixed end, wherein the second free end of the second shoe is disposed axially adjacent to the first fixed end of the first shoe, and wherein the second fixed end of the second shoe is disposed axially adjacent to the first free end of the first shoe;
  - at least one pin that is engaged with the first seal ring and the second seal ring such that the first and second seal rings are attached to each other via the pin; and
  - a seal element connected to and extending radially inward from at least one of the first shoe and the second shoe.

11. The seal assembly of claim 10, wherein the seal assembly is disposed in a turbine section of the gas turbine engine.

12. The seal assembly of claim 10, wherein the floating non-contact seal comprises a hydrostatic seal.

13. The seal assembly of claim 10, wherein the floating non-contact seal is configured to sealingly engage with the rotating element.

* * * * *